US010731596B2

(12) United States Patent
Sugano

(10) Patent No.: US 10,731,596 B2
(45) Date of Patent: Aug. 4, 2020

(54) INTERNAL COMBUSTION ENGINE AND CONTROL DEVICE FOR INTERNAL COMBUSTION ENGINE

(71) Applicant: TOYOTA JIDOSHA KABUSHIKI KAISHA, Toyota-shi (JP)

(72) Inventor: Tsubasa Sugano, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/442,640

(22) Filed: Jun. 17, 2019

(65) Prior Publication Data
US 2020/0003145 A1    Jan. 2, 2020

(30) Foreign Application Priority Data

Jun. 27, 2018  (JP) .................................. 2018-122111

(51) Int. Cl.
*F02D 41/14*     (2006.01)
*F02D 41/40*     (2006.01)
*F02D 35/02*     (2006.01)

(52) U.S. Cl.
CPC ......... *F02D 41/402* (2013.01); *F02D 35/027* (2013.01); *F02D 41/401* (2013.01)

(58) Field of Classification Search
CPC .. F02D 41/401; F02D 41/402; F02D 41/1401; F02D 41/1498; F02D 35/027; F02D 35/028; F02D 2041/1412; F02D 2200/025; G01L 23/225; G01M 15/11
USPC ......... 123/435, 436; 701/103–105, 110, 111; 73/35.09, 114.07, 114.22, 114.24
See application file for complete search history.

(56) References Cited

U.S. PATENT DOCUMENTS

| 6,089,077 | A  | * | 7/2000  | Daniels  | F02D 35/021 |
|           |    |   |         |          | 73/35.03    |
| 8,301,356 | B2 | * | 10/2012 | Wang     | F02D 35/026 |
|           |    |   |         |          | 123/435     |
| 8,402,939 | B2 | * | 3/2013  | Reuss    | F02D 35/023 |
|           |    |   |         |          | 123/299     |
| 9,376,980 | B2 | * | 6/2016  | Kuzuyama | F02D 41/30  |
| 9,856,845 | B2 | * | 1/2018  | Mori     | F02D 41/024 |
| 2009/0259383 | A1 | * | 10/2009 | Wang  | F02D 35/023 |
|           |    |   |         |          | 701/102     |
| 2015/0090217 | A1 |   | 4/2015  | Kuzuyama et al. | |

(Continued)

FOREIGN PATENT DOCUMENTS

| JP | 2004-353531 A | 12/2004 |
| JP | 2006-046217   | 2/2006  |
| JP | 2008-82244 A  | 4/2008  |

(Continued)

*Primary Examiner* — Hai H Huynh
(74) *Attorney, Agent, or Firm* — Oblon, McClelland, Maier & Neustadt, L.L.P.

(57) ABSTRACT

A combustion control part of a control device for an internal combustion engine configured to calculate a first vibration level of an engine body at a first judgment frequency band of a second overtone of a specific frequency band based on vibration acceleration detected by a vibration sensor and, when the first vibration level is less than a predetermined first reference vibration level set in advance according to the engine operating state, to correct one or both of a target injection amount and target injection timing so that the first vibration level becomes the first reference vibration level or more.

8 Claims, 8 Drawing Sheets

(56) References Cited

U.S. PATENT DOCUMENTS

2016/0341135 A1 11/2016 Shirahashi et al.
2017/0184048 A1 6/2017 Shirahashi et al.

FOREIGN PATENT DOCUMENTS

| JP | 2015-068284 | 4/2015 |
| JP | 2016-217215 | 12/2016 |

* cited by examiner

INTERNAL COMBUSTION ENGINE AND CONTROL DEVICE FOR INTERNAL COMBUSTION ENGINE

FIELD

The present disclosure relates to an internal combustion engine and a control device for the internal combustion engine.

BACKGROUND

Japanese Unexamined Patent Publication No. 2015-068284 discloses a conventional control device of an internal combustion engine configured to perform main fuel injection divided into a first main fuel injection and a second main fuel injection to make fuel burn by self ignition so that a shape of a pressure waveform showing a change along with time of a rate of rise of cylinder pressure (pattern of rate of rise of cylinder pressure) becomes a two-peak shape and so that an interval between a peak timing of a first peak of the pressure waveform and a peak timing of a second peak becomes a predetermined interval. According to Japanese Unexamined Patent Publication No. 2015-068284, it is considered that by controlling the peak interval between the peak timing of the first peak and peak timing of the second peak of the pressure waveform to a predetermined interval in this way, it is possible to reduce the vibration level at a predetermined frequency band and reduce the combustion noise.

SUMMARY

However, if, for example, due to some factor or another, the ignition timing deviates from the target ignition timing and the shape of the pressure waveform ends up changing from the targeted two-peak shape, the peak interval can no longer be controlled to the predetermined interval, so it is liable to become impossible to reduce the combustion noise.

The present disclosure was made focusing on such a problem and has as its object to be able to judge if the shape of the pressure waveform has changed from the targeted two-peak shape and to correct the shape of the pressure waveform in accordance with the results of judgment.

To solve the above problem, according to one aspect of the present disclosure, there is provided a control device for an internal combustion engine. The internal combustion engine comprises an engine body, a fuel injector injecting fuel for combustion inside a combustion chamber of the engine body, and a vibration sensor detecting vibration acceleration of the engine body. The control device comprises a combustion control part configured to control an injection amount and injection timing of fuel injected from the fuel injector to a target injection amount and target injection timing set based on an engine operating state to cause the fuel to burn by self ignition so as to cause generation of heat in the combustion chamber two times in stages so a pressure waveform showing a change along with time of a rate of rise of cylinder pressure becomes a two-peak shape and so that a peak interval from a first peak value of a first peak of the pressure waveform formed by the first heat generation to a second peak value of a second peak of the pressure waveform formed by the second heat generation becomes a reference peak interval suppressing vibration acceleration of a specific frequency band in vibration acceleration of the engine body. The combustion control part is configured to calculate a first vibration level of the engine body in a first judgment frequency band of a second overtone of the specific frequency based on vibration acceleration detected by the vibration sensor and, when the first vibration level is less than a predetermined first reference vibration level set in advance according to the engine operating state, correct one or both of the target injection amount and the target injection timing so that the first vibration level becomes the first reference vibration level or more.

To solve the above problem, according to another aspect of the present disclosure, there is provided an internal combustion engine comprising an engine body, a fuel injector injecting fuel for combustion inside a combustion chamber of the engine body, a vibration sensor detecting vibration acceleration of the engine body and a control device configured to control an injection amount and injection timing of fuel injected from the fuel injector to a target injection amount and target injection timing set based on an engine operating state to cause the fuel to burn by self ignition so as to cause generation of heat in the combustion chamber two times in stages so a pressure waveform showing a change along with time of a rate of rise of cylinder pressure becomes a two-peak shape and so that a peak interval from a first peak value of a first peak of the pressure waveform formed by the first heat generation to a second peak value of a second peak of the pressure waveform formed by the second heat generation becomes a reference peak interval suppressing vibration acceleration of a specific frequency band in vibration acceleration of the engine body. The control device is further configured to calculate a first vibration level of the engine body in a first judgment frequency band of a second overtone of the specific frequency based on vibration acceleration detected by the vibration sensor and, when the first vibration level is less than a predetermined first reference vibration level set in advance according to the engine operating state, correct one or both of the target injection amount and the target injection timing so that the first vibration level becomes the first reference vibration level or more.

According to these aspect of the present disclosure, it is possible to judge if the shape of the pressure waveform has changed from the targeted two-peak shape and to correct the shape of the pressure waveform in accordance with the results of judgment.

DESCRIPTION OF EMBODIMENTS

Figure 1:
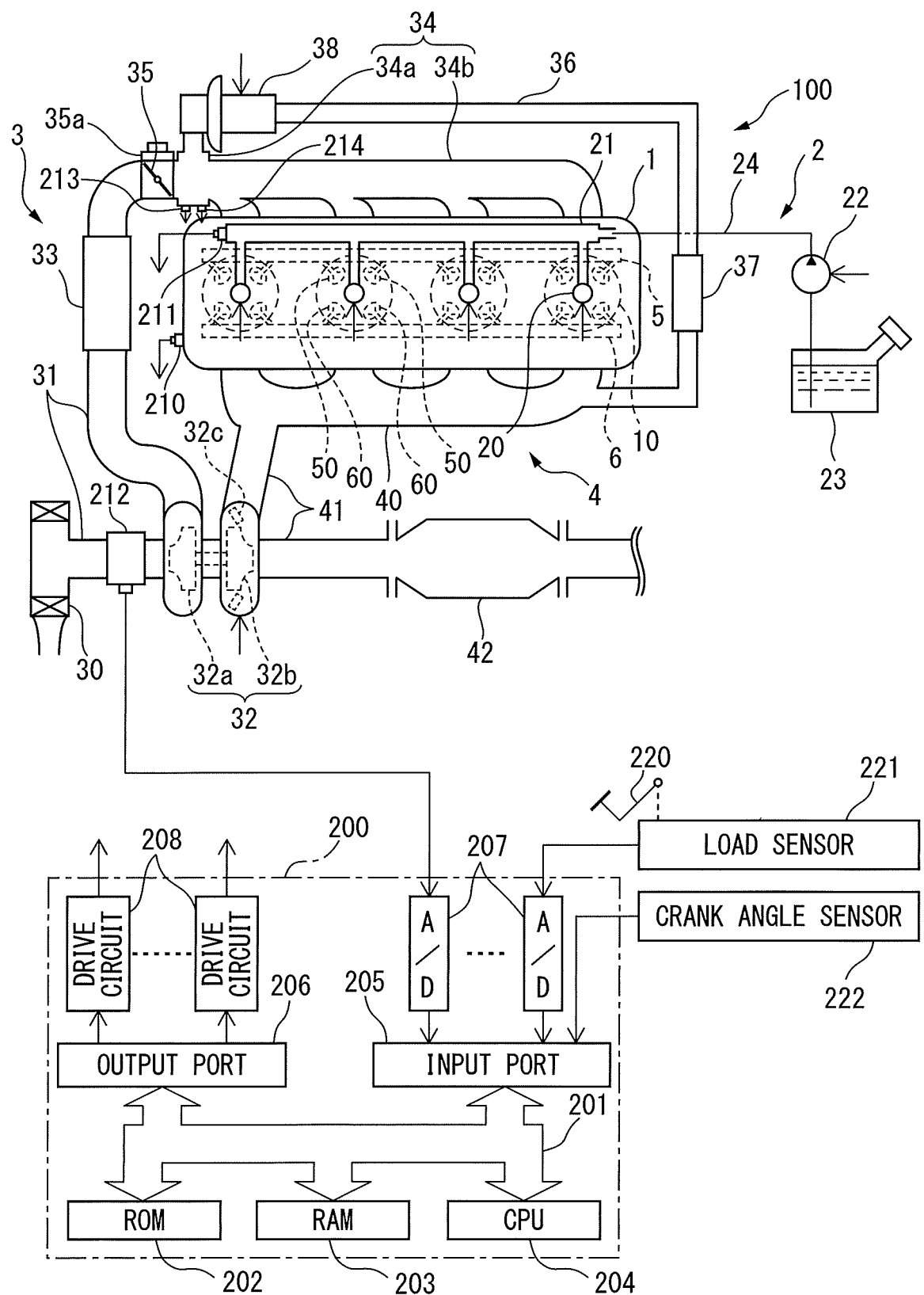
FIG. 1 is a schematic view of the configurations of an internal combustion engine and an electronic control unit for controlling the internal combustion engine according to a first embodiment of the present disclosure.

Below, referring to the drawings, embodiments of the present disclosure will be explained in detail. Note that, in the following explanation, similar component elements will be assigned the same reference notations.

First Embodiment

Figure 2:
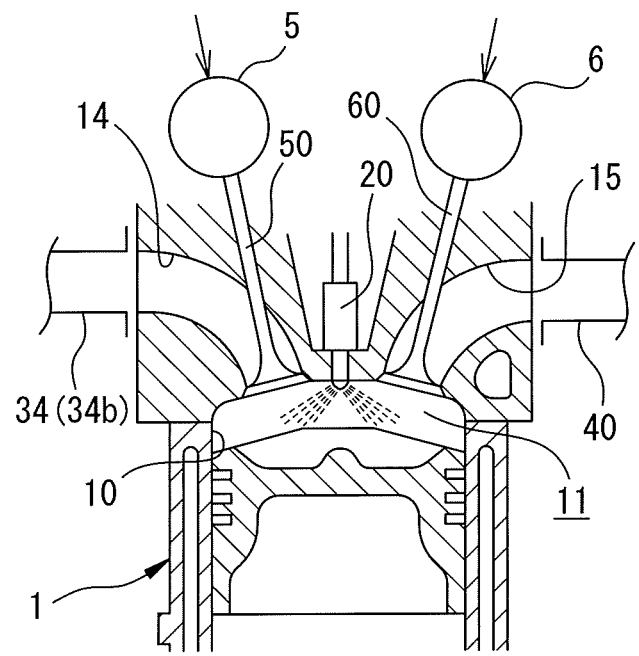
FIG. 2 is a cross-sectional view of an engine body of an internal combustion engine according to the first embodiment of the present disclosure.

FIG. 1 is a schematic view of the configurations of an internal combustion engine 100 and an electronic control unit 200 for controlling the internal combustion engine 100 according to a first embodiment of the present disclosure. FIG. 2 is a cross-sectional view of an engine body 1 of the internal combustion engine 100.

As shown in FIG. 1, the internal combustion engine 100 is provided with an engine body 1 provided with a plurality of cylinders 10, a fuel supply system 2, an intake system 3, an exhaust system 4, an intake valve operating system 5, and an exhaust valve operating system 6.

The engine body 1 makes fuel burn in combustion chambers 11 formed in the cylinders 10 (see FIG. 2) to for example generate power for driving a vehicle etc. The engine body 1 is provided with a pair of intake valves 50 and a pair of exhaust valves 60 for each cylinder. The engine body 1 is provided with a knock sensor 210 detecting vibration acceleration of the engine body 1. The knock sensor 210 is a type of vibration sensor (acceleration sensor) including a piezoelectric element, and outputs a voltage value according to the vibration acceleration of the engine body 1.

The fuel supply system 2 is provided with electronic control type fuel injectors 20, a delivery pipe 21, supply pump 22, fuel tank 23, pumping pipe 24, and fuel pressure sensor 211.

One fuel injector 20 is provided at each cylinder 10 so as to face a combustion chamber 11 of the cylinder 10 so as to enable fuel to be directly injected into the combustion chamber 11. The opening time (injection amount) and opening timing (injection timing) of the fuel injector 20 are changed by control signals from the electronic control unit 200. If a fuel injector 20 is operated, fuel is directly injected from the fuel injector 20 to the inside of the combustion chamber 11.

The delivery pipe 21 is connected through the pumping pipe 24 to the fuel tank 23. In the middle of the pumping pipe 24, a supply pump 22 is provided for pressurizing the fuel stored in the fuel tank 23 and supplying it to the delivery pipe 21. The delivery pipe 21 temporarily stores the high pressure fuel pumped from the supply pump 22. If a fuel injector 20 is operated, the high pressure fuel stored in the delivery pipe 21 is directly injected from the fuel injector 20 to the inside of a combustion chamber 11.

The supply pump 22 is configured to be able to change the discharge amount. The discharge amount of the supply pump 22 is changed by a control signal from the electronic control unit 200. By controlling the discharge amount of the supply pump 22, the fuel pressure inside the delivery pipe 21, that is, the injection pressure of the fuel injector 20, is controlled.

The fuel pressure sensor 211 is provided in the delivery pipe 21. The fuel pressure sensor 211 detects the fuel pressure inside the delivery pipe 21, that is, the pressure of the fuel injected from the fuel injectors 20 to the insides of the cylinders 10 (injection pressure).

The intake system 3 is a system for guiding air to the insides of the combustion chambers 11 and is configured to enable change of the state of air taken into the combustion chambers 11 (intake pressure (supercharging pressure), intake temperature, and amount of EGR (exhaust gas recirculation) gas). That is, the intake system 3 is configured to be able to change the oxygen density inside the combustion chambers 11. The intake system 3 is provided with an air cleaner 30, intake pipe 31, compressor 32a of a turbocharger 32, intercooler 33, intake manifold 34, electronic control type throttle valve 35, air flow meter 212, EGR passage 36, EGR cooler 37, and EGR valve 38.

The air cleaner 30 removes sand and other foreign matter contained in the air.

The intake pipe 31 is coupled at one end to an air cleaner 30 and is coupled at the other end to a surge tank 34a of the intake manifold 34.

The turbocharger 32 is a type of supercharger. It uses the energy of the exhaust to forcibly compress the air and supplies the compressed air to the combustion chambers 11. Due to this, the charging efficiency is enhanced, so the engine output increases. The compressor 32a is a part forming a portion of the turbocharger 32 and is provided at the intake pipe 31. The compressor 32a is turned by a turbine 32b of the later explained turbocharger 32 provided coaxially with it and forcibly compresses the air. Note that instead of the turbocharger 32, it is also possible to use a supercharger mechanically driven utilizing the rotational force of a crankshaft (not shown).

The intercooler 33 is provided downstream from the compressor 32a in the intake pipe 31 and cools the air which was compressed by a compressor 32a and thereby became high in temperature.

The intake manifold 34 is provided with the surge tank 34a and a plurality of intake runners 34b branched from the surge tank 34a and connected with openings of intake ports 14 (see FIG. 2) formed inside of the engine body 1. The air guided to the surge tank 34a is evenly distributed through the intake runners 34b and intake ports 14 to the insides of the combustion chambers 11. In this way, the intake pipe 31, intake manifold 34, and intake ports 14 form an intake passage for guiding air to the insides of the combustion chambers 11. At the surge tank 34a, a pressure sensor 213 for detecting the pressure inside the surge tank 34a (intake pressure) and a temperature sensor 214 for detecting the temperature inside the surge tank 34a (intake temperature) are attached.

The throttle valve 35 is provided inside the intake pipe 31 between the intercooler 33 and the surge tank 34a. The throttle valve 35 is driven by a throttle actuator 35a and makes the passage cross-sectional area of the intake pipe 31 change continuously or in stages. By using the throttle actuator 35a to adjust the opening degree of the throttle valve 35, it is possible to adjust the amount of flow of air taken into the combustion chambers 11.

The air flow meter 212 is provided at the upstream side from the compressor 32a inside the intake pipe 31. The air flow meter 212 detects the amount of flow of air flowing through the intake passage and finally taken into the combustion chambers 11 (below, referred to as the "intake air amount").

The EGR passage 36 is a passage which connects the later explained exhaust manifold 40 and the surge tank 34a of the intake manifold 34 and returns part of the exhaust discharged from the combustion chambers 11 to the surge tank 34a using the pressure difference. Below, the exhaust introduced into the EGR passage 36 will be called the "EGR gas" and the ratio of the amount of EGR gas in the amount of gas in the cylinders, that is, the rate of recirculation of the exhaust, will be called the "EGR rate". By making the EGR gas be recirculated to the surge tank 34a and in turn the combustion chambers 11, it is possible to reduce the combustion temperature and keep down the discharge of nitrogen oxides ($NO_x$).

The EGR cooler 37 is provided at the EGR passage 36. The EGR cooler 37 is a heat exchanger for cooling the EGR gas by, for example, running wind, cooling water, etc.

The EGR valve 38 is provided at the downstream side in the flow direction of the EGR gas from the EGR cooler 37 in the EGR passage 36. The EGR valve 38 is a solenoid valve able to be adjusted in opening degree continuously or in stages. The opening degree is controlled by the electronic control unit 200. By controlling the opening degree of the EGR valve 38, the flow rate of the EGR gas recirculated to the surge tank 34a is adjusted. That is, by controlling the opening degree of the EGR valve 38 to a suitable opening degree in accordance with the intake air amount or intake pressure (supercharging pressure) etc., it is possible to control the EGR rate to any value.

The exhaust system 4 is a system for purifying the exhaust generated inside the combustion chambers and discharging it to the outside air and is provided with the exhaust manifold 40, exhaust pipe 41, turbine 32b of the turbocharger 32, and exhaust after-treatment device 42.

The exhaust manifold 40 is provided with a plurality of exhaust runners which are connected to openings of exhaust ports 15 (see FIG. 2) formed inside the engine body 1 and a header which collects the exhaust runners and merges them into one.

The exhaust pipe 41 is connected at one end to a header of the exhaust manifold 40 and is open at the other end. The exhaust discharged from the combustion chambers 11 through the exhaust ports to the exhaust manifold 40 flows through the exhaust pipe 41 and is discharged to the outside air.

The turbine 32b is a part forming a portion of the turbocharger 32 and is provided at the exhaust pipe 41. The turbine 32b is turned by energy of the exhaust and drives the coaxially provided compressor 32a.

At the outside of the turbine 32b, a variable nozzle 32c is provided. The variable nozzle 32c functions as a throttle valve. The nozzle opening degree of the variable nozzle 32c (valve opening degree) is controlled by the electronic control unit 200. By changing the nozzle opening degree of the variable nozzle 32c, it is possible to change the flow rate of the exhaust driving the turbine 32b. That is, by changing the nozzle opening degree of the variable nozzle 32c, it is possible to change the rotational speed of the turbine 32b and change the supercharging pressure. Specifically, if making the nozzle opening degree of the variable nozzle 32c smaller (throttling the variable nozzle 32c), the flow rate of the exhaust will rise and the rotational speed of the turbine 32b will increase resulting in an increase of the supercharging pressure.

The exhaust after-treatment device 42 is provided at the downstream side from the turbine 32b in the exhaust pipe 41. The exhaust after-treatment device 42 is a device for purifying the exhaust and then discharging it to the outside air and contains various types of catalysts for removing harmful substances (for example, a three-way catalyst) carried on a support.

The intake valve operating system 5 is a system for driving operation of the intake valves 50 of the cylinders 10 and is provided at the engine body 1. The intake valve operating system 5 according to the present embodiment is configured to enable control of the operating timings of the intake valves 50, for example, to drive operation of the intake valves 50 by electromagnetic actuators.

The exhaust valve operating system 6 is a system for driving operation of the exhaust valves 60 of the cylinders 10 and is provided at the engine body 1. The exhaust valve operating system 6 according to the present embodiment is configured to enable control of the operating timings of the exhaust valves 60, for example, to drive operation of the exhaust valves by electromagnetic actuators.

Note that, the intake valve operating system 5 and exhaust valve operating system 6 are not limited to electromagnetic actuators. For example, it is also possible to use a camshaft to drive the operation of the intake valves 50 or exhaust valves 60 and provide at one end of the camshaft a variable valve operation mechanism changing the relative phase angle of the camshaft to the crankshaft by hydraulic control to thereby enable control of the operating timings of the intake valves 50 or exhaust valves 60.

The electronic control unit 200 is comprised of a digital computer having components connected with each other by a bidirectional bus 201 such as a ROM (read only memory) 202, RAM (random access memory) 203, CPU (microprocessor) 204, input port 205, and output port 206.

The input port 205 receives as input the output signals of the above-mentioned knock sensor 210 etc. through corresponding AD converters 207. Further, the input port 205 receives as input, as a signal for detecting the engine load, an output voltage of a load sensor 221 generating an output voltage proportional to the amount of depression of the accelerator pedal 221 (below, referred to as the "amount of accelerator depression") through a corresponding AD converter 207. Further, the input port 205 receives as input, as a signal for calculating the engine rotational speed etc., the output signal of a crank angle sensor 222 generating an output pulse each time the crankshaft of the engine body 1 rotates by for example 15°. In this way, the input port 205 receives as input the output signals of various sensors required for control of the internal combustion engine 100.

The output port 206 is connected through corresponding drive circuits 208 to the fuel injectors 20 and other controlled parts.

The electronic control unit 200 outputs control signals for controlling the different controlled parts from the output port 206 based on the output signals of various sensors input to the input port 205 so as to control the internal combustion engine 100. Below, the control of the internal combustion engine 100 which the electronic control unit 200 performs, in particular the combustion control of the fuel inside of the combustion chambers 11, will be explained.

Figure 3:
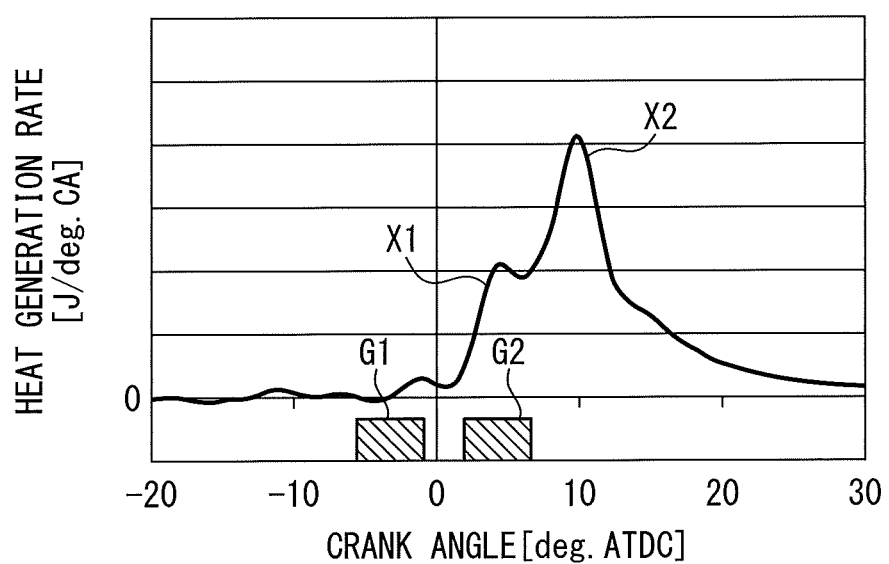
FIG. 3 is a view showing the relationship between a crank angle and heat generation rate in the case of performing combustion control according to the first embodiment of the present disclosure to burn fuel in a combustion chamber.

FIG. 3 is a view showing the relationship between the crank angle and heat generation rate in the case of performing the combustion control according to the present embodiment to make fuel burn in a combustion chamber 11 at the time when the engine operating state (engine rotational speed and engine load) is a certain steady state operation.

Figure 4:
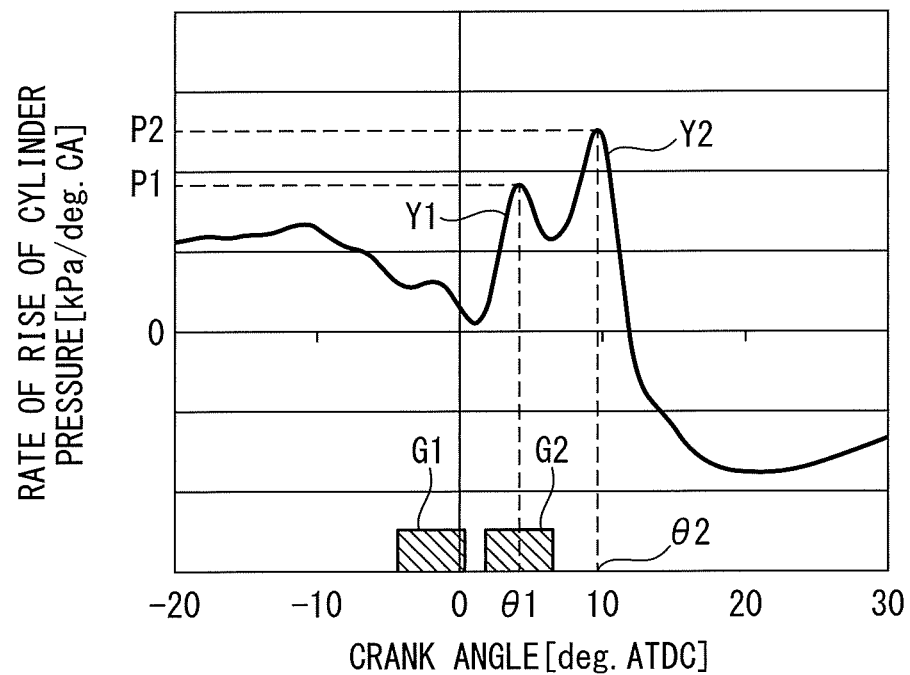
FIG. 4 is a view showing the relationship between a crank angle and rate of rise of cylinder pressure in the case of performing combustion control according to the first embodiment of the present disclosure to burn fuel in a combustion chamber.

Further, FIG. 4 is a view showing the relationship between the crank angle and the rate of cylinder pressure rise in this case.

Note that the "heat generation rate $(dQ/d\theta)$ [J/deg·CA]" is the amount of heat per unit crank angle generated when making fuel burn, that is, the amount Q of heat generated per unit crank angle. In the following explanation, the combustion waveform showing this relationship between the crank angle and heat generation rate, that is, the combustion waveform showing the change over time of the heat generation rate, will be called the "heat generation rate pattern". Further, the "rate of cylinder pressure rise $(dP/d\theta)$ [kPa/deg·CA]" is the crank angle differential of the cylinder pressure P [kPa]. In the following explanation, the pressure waveform showing this relationship between the crank angle and the rate of cylinder pressure rise, that is, the pressure waveform showing the change over time of the rate of cylinder pressure rise, will be called the "cylinder pressure rise pattern".

As shown in FIG. 3, the electronic control unit 200 successively performs main fuel injection performed for outputting a required torque corresponding to the engine load divided into a first main fuel injection G1 and a second main fuel injection G2 so as to make the injected fuel burn by self ignition to operate the engine body 1.

The present embodiment is designed so that the injection amounts and injection timings of the fuel injections are controlled so the fuel injected in the combustion chamber 11 by the first main fuel injection G1 (below, referred to as the "first main fuel") and the fuel injected in the combustion chamber 11 by the second main fuel injection G2 (below, referred to as the "second main fuel") are burned by homogeneous charge compression ignition combustion, where they are burned after a certain amount of premixing time with air after fuel injections G1 and G2 to thereby cause heat generation two times in stages.

That is, as shown in FIG. 3, to enable a first peak of a combustion waveform X1 of the heat generation rate pattern to be formed by generation of heat mainly when the first main fuel is burned and then a second peak of a combustion waveform X2 of the heat generation rate pattern to be formed by generation of heat mainly when the second main fuel is burned, the injection amounts and injection timings of the fuel injections G1, G2 are controlled so that the heat generation rate pattern becomes a two-peak shape.

Further, due to this, as shown in FIG. 4, a first peak of a pressure waveform Y1 of the cylinder pressure rise pattern is formed by generation of heat mainly when the first main fuel is burned and then a second peak of a pressure waveform Y2 of the cylinder pressure rise pattern is formed by generation of heat mainly when the second main fuel is burned whereby the cylinder pressure rise pattern also becomes a two-peak shape along with the heat generation rate pattern.

By causing heat generation two times in stages in this way, the pressure wave generated due to the first heat generation (in the present embodiment, mainly the pressure wave generated at the time of combustion of the first main fuel) and the pressure wave generated due to the second heat generation (in the present embodiment, mainly the pressure wave generated at the time of combustion of the second main fuel) become pressure waves of reverse phases at a specific frequency band and cancel each other out. As a result, it is possible to reduce the vibration level [dB] of the engine body 1 at the specific frequency band.

Further, the frequency band at which the pressure wave generated due to the first heat generation and the pressure wave generated due to the second heat generation cancel each other out (below, referred to as the "attenuation frequency band") changes, if the engine rotational speed is the same, in accordance with the crank interval (below, referred to as the "peak interval") $\Delta\theta$ $(=\theta 2-\theta 1)$ from the peak value P1 of the pressure waveform Y1 (below, referred to as the "first peak value") to the peak value P2 of the pressure waveform Y2 (below, referred to as the "second peak value"). The narrower the peak interval $\Delta\theta$, the more this moves to the high frequency side while the broader the peak interval, the more this moves to the low frequency side.

Therefore, in the present embodiment, the injection amounts and injection timings of the fuel injections G1 and G2 are controlled so that heat generation occurs two times in stages and so that the peak interval $\Delta\theta$ becomes the peak interval $\Delta\theta t$ (below, referred to as the "reference peak interval") able to reduce the vibration level of the frequency band particularly perceived as unpleasant noise in the noise generated from the engine body 1 (below, referred to as the "target attenuation frequency band", in the present embodiment, 1.5 to 1.7 kHz).

However, for example, if, due to transitory changes in the cylinder environment (cylinder pressure, cylinder temperature, or cylinder oxygen density) or some other such factor, the gap between the ignition timing and the target ignition timing becomes larger, the shape of the pattern of the heat generation rate and in turn the pattern of rate of rise of cylinder pressure will sometimes change from the target shape (shape enabling vibration level of target attenuation frequency band to be reduced).

For example, sometimes the gap between the ignition timing and the target ignition timing becomes greater and the shape of the pattern of rate of rise of cylinder pressure changes from the target shape and therefore the peak interval $\Delta\theta$ becomes narrower or broader than the reference peak interval $\Delta\theta t$. In this case, the attenuation frequency band ends up deviating from the target attenuation frequency band, so it is no longer possible to reduce the vibration level of the target attenuation frequency band and no longer possible to obtain the desired noise reduction effect.

Further, for example, sometimes the gap between the ignition timing and the target ignition timing will become greater and the first main fuel and the second main fuel will not be burned in stages but will end up being burned together, it will not be possible to cause heat generation two times in stages, and the shape of the pattern of the heat generation rate and in turn the pattern of rate of rise of cylinder pressure will end up becoming a single peak shape. In this case, it will no longer be possible to obtain the noise reduction effect itself of the engine body 1 at a specific frequency band where the pressure wave generated by the first heat generation and the pressure wave generated by the second heat generation cancel each other out.

Therefore, if the shape of the pattern of rate of rise of cylinder pressure has changed from the target shape over the allowable range, it is preferable to correct the injection amounts and injection timings of the fuel injections G1 and G2 so that the shape of the pattern of rate of rise of cylinder pressure approaches the target shape. Below, referring to FIG. 5, the method of judging whether the shape of the pattern of rate of rise of cylinder pressure has changed from the target shape over the allowable range according to the present embodiment will be explained.

Figure 5:
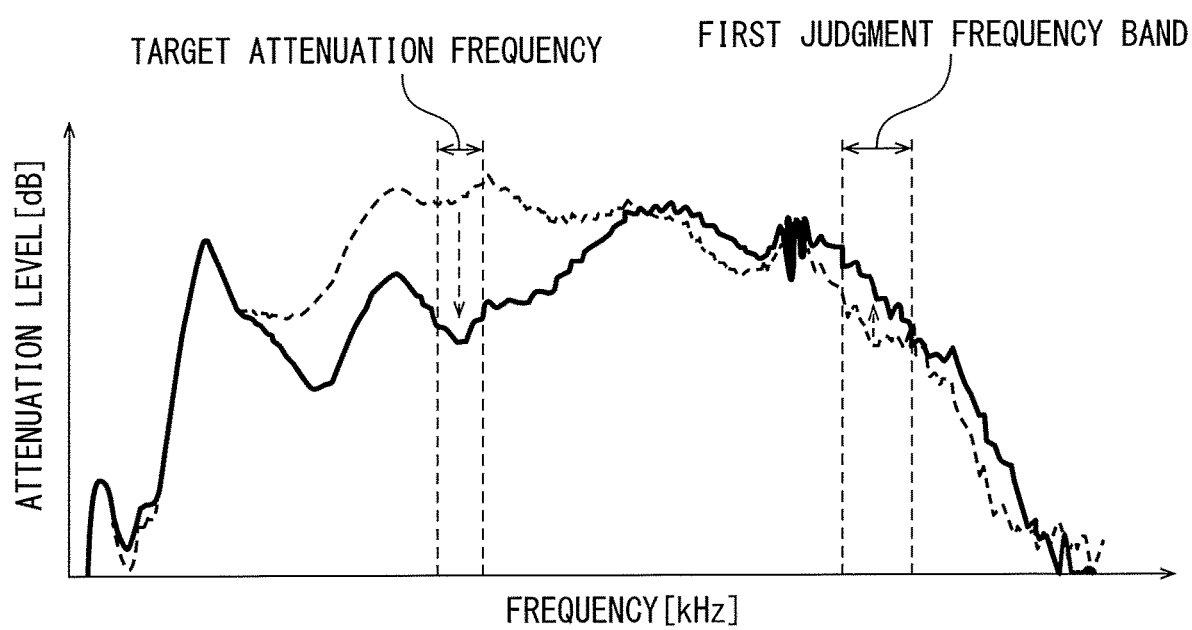
FIG. 5 is a view showing a vibration level of an engine body for each frequency calculated based on an output value of a knock sensor.

FIG. 5 is a view showing the vibration level of the engine body 1 for each frequency calculated based on the output value of the knock sensor 210. Note that, in FIG. 5, the solid line shows the vibration level of the engine body 1 for each frequency in the case where the pattern of rate of rise of cylinder pressure is the target shape, that is, in the case of causing heat generation two times in stages to control the peak interval Δθ to the reference peak interval Δθt. On the other hand, the broken line is shown for comparison and shows the vibration level of the engine body 1 for each frequency in the case where the amount of fuel injected from the fuel injector 20 and the injection timing are controlled so that the pattern of rate of rise of cylinder pressure becomes a single peak shape.

As shown in FIG. 5 by the solid line, it is learned that when the pattern of rate of rise of cylinder pressure becomes the target shape, it is possible to make the attenuation frequency band match the target attenuation frequency band, so the vibration level at the target attenuation frequency band falls below the vibration level shown by the broken line.

Here, as the method for judging if the shape of the pattern of rate of rise of cylinder pressure has changed from the target shape over the allowable range, for example, the method may be mentioned of judging that the shape of the pattern of rate of rise of cylinder pressure has changed from the target shape over the allowable range if the vibration level of the target attenuation frequency band has become a predetermined threshold value or more. This is because if the vibration level of the target attenuation frequency band is a predetermined threshold value or more, it is possible judge that the peak interval Δθ ends up deviating from the reference peak interval Δθt and, as a result, the attenuation frequency band ends up deviating from the target attenuation frequency band and the vibration level of the target attenuation frequency band increases or that the pattern of rate of rise of cylinder pressure ends up becoming a single peak shape and the effect of reduction of noise by two pressure waves cannot be obtained and the vibration level of the target attenuation frequency band increases.

However, if the attenuation frequency band and target attenuation frequency band match, the two pressure waves cancel each other out and the vibration level falls, so the accuracy of calculation of the vibration level at such a frequency band tends to easily deteriorate and mistaken judgment is liable to be invited.

Therefore, in the present embodiment, note was taken of the frequency band of the second overtone of the target attenuation frequency band (below, referred to as the "first judgment frequency band"). As shown in FIG. 5, it is learned that if the attenuation frequency band and the target attenuation frequency band match, at this first judgment frequency band, the vibration level shown by the solid line increases over the vibration level shown by the broken line.

That is, as a result of intensive research by the inventors, it was learned that if the pattern of rate of rise of cylinder pressure becomes the target shape and the peak interval Δθ can be controlled to the reference peak interval Δθt, at the frequency band of the second overtone of the attenuation frequency band, the two pressure waves interfere with each other and amplify each other and the vibration level conversely increases.

If in this way the pattern of rate of rise of cylinder pressure becomes the target shape and the peak interval Δθ can be controlled to the reference peak interval Δθt, the first vibration level of the first judgment frequency band increases. On the other hand, if the shape of the pattern of rate of rise of cylinder pressure ends up changing from the target shape over the allowable range and the peak interval Δθ cannot be controlled to the reference peak interval Δθt, the attenuation frequency band ends up deviating from the target attenuation frequency band and, as a result, the frequency band of the second overtone of the attenuation frequency band ends up deviating from the first judgment frequency band, so the first vibration level at this first judgment frequency band becomes lower compared with the case where the peak interval Δθ can be controlled to the reference peak interval Δθt. Further, this first judgment frequency band is the frequency band where two pressure waves interfere with each other and the vibration level increases, so it is possible to keep the accuracy of calculation of the vibration level from deteriorating.

Therefore, the present embodiment is designed so that it is judged if the first vibration level of the first judgment frequency band is the first reference vibration level set in advance according to the engine operating state or is more and, if the first vibration level of the first judgment frequency band is less than the first reference vibration level, that the shape of the pattern of rate of rise of cylinder pressure has changed from the target shape over the allowable range. Further, in this case, it is designed to correct the target value of the fuel injection amount or fuel injection timing set according to the engine operating state so that the pattern of rate of rise of cylinder pressure becomes the target shape. Below, referring to FIG. 6, the combustion control according to the present embodiment will be explained.

Figure 6:
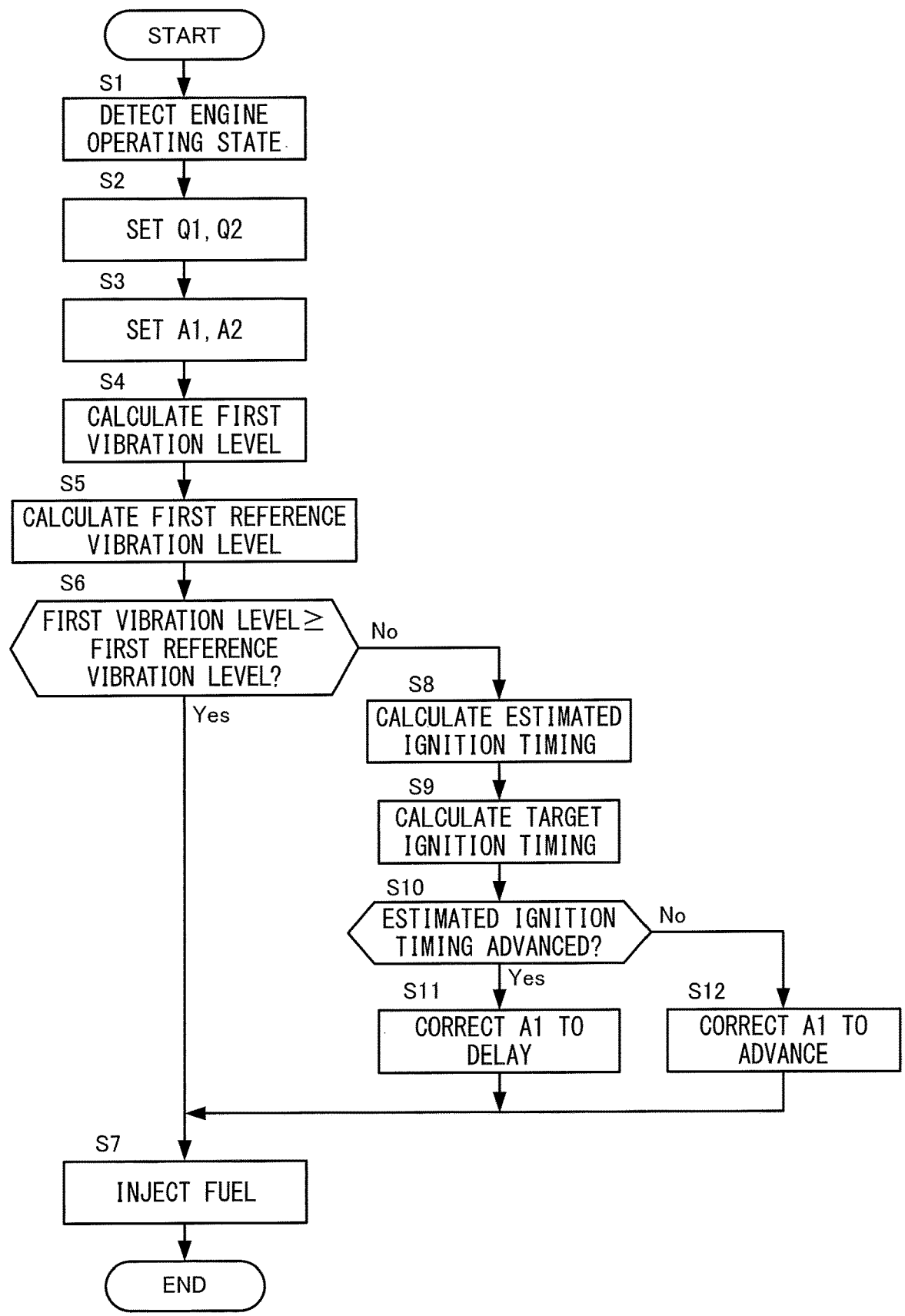
FIG. 6 is a flow chart explaining combustion control according to the first embodiment of the present disclosure.

FIG. 6 is a flow chart explaining combustion control according to the present embodiment. The electronic control unit 200 repeatedly performs the present routine by a predetermined processing cycle during engine operation.

At step S1, the electronic control unit 200 reads in an engine load detected by the load sensor 221 and an engine rotational speed calculated based on the output signal of the crank angle sensor 222 and detects the engine operating state.

At step S2, the electronic control unit 200 sets the target injection amount Q1 of the first main fuel injection G1 and the target injection amount Q2 of the second main fuel injection G2. In the present embodiment, the electronic control unit 200 refers to a table prepared in advance by experiments etc. and sets the target injection amount Q1 and target injection amount Q2 based on at least the engine load.

At step S3, the electronic control unit 200 sets a target injection timing A1 of the first main fuel injection G1 and a target injection timing A2 of the second main fuel injection G2. In the present embodiment, the electronic control unit 200 refers to a table prepared in advance by experiments etc. and sets the target injection timing A1 and target injection timing A2 based on the engine operating state.

At step S4, the electronic control unit 200 applies various processing to the output value of the knock sensor 210 at the combustion noise judgment section acquired at the previous combustion cycle (for example, band pass filtering using the first judgment frequency band as the band width) to calculate the first vibration level of the first judgment frequency band. In the present embodiment, the first judgment frequency band is made the frequency band from 3.0 kHz to 3.4 kHz. Further, the combustion noise judgment section is made the section corresponding to the range of crank angle from the middle of the compression stroke to the middle of the expansion stroke of each cylinder 10.

At step S5, the electronic control unit 200 refers to a map prepared in advance by experiments etc. and calculates the first reference vibration level based on the engine operating state.

At step S6, the electronic control unit 200 judges if the first vibration level is the first reference vibration level or more. If the first vibration level is the first reference vibration level or more, the electronic control unit 200 proceeds to the processing of step S7. On the other hand, if the first vibration level is less than the first reference vibration level, the electronic control unit 200 proceeds to the processing of step S8.

At step S7, the electronic control unit 200 controls the injection amount and injection timing of the first main fuel injection G1 to the respective first target injection amount Q1 and first target injection timing A1 and controls the injection amount and injection timing of the second main fuel injection G2 to the respective second target injection amount Q2 and first target injection timing A2 to perform fuel injection.

At step S8, the electronic control unit 200 calculates an estimated value of the ignition timing of fuel in the previous combustion cycle (below, referred to as the "estimated ignition timing"). In the present embodiment, the electronic control unit 200 calculates the vibration level for each crank angle in the combustion noise judgment section based on the output of the knock sensor 210 at the combustion noise judgment section obtained at the previous combustion cycle and calculates the crank angle where that vibration level becomes a predetermined ignition timing judgment threshold value as the estimated ignition timing. Note that, calculation of the estimated ignition timing is not limited to such a technique. Any known technique may be used. For example, if providing a cylinder pressure sensor, the timing at which the cylinder pressure detected by the cylinder pressure sensor becomes a predetermined value or more may be calculated as the estimated ignition timing.

At step S9, the electronic control unit 200 calculates the target ignition timing at the previous combustion cycle. The target ignition timing, for example, can be calculated by inputting the target injection amount of the previous combustion cycle etc. into an ignition timing prediction model.

At step S10, the electronic control unit 200 judges if the estimated ignition timing at the previous combustion cycle is advanced or delayed from the target ignition timing. If the estimated ignition timing at the previous combustion cycle is advanced from the target ignition timing, the electronic control unit 200 proceeds to the processing of step S11, while if it is delayed, proceeds to the processing of step S12.

At step S11, the electronic control unit 200 corrects the target injection timing A1 of the first main fuel injection G1 so that the ignition timing is delayed. Specifically, it performs correction to delay the target injection timing A1 of the first main fuel injection G1 in accordance with the amount of advance of the estimated ignition timing from the target ignition timing.

Note that, in the present embodiment, in this way, the ignition timing is delayed by correcting the target injection timing A1 of the first main fuel injection G1 to the delayed side, but, for example, instead of such delaying control of the target injection timing A1 or together with delaying control, it is also possible to correct the target injection amount Q1 to the decreased side to thereby delay the ignition timing. Note that, in this case, it is sufficient to jointly perform correction increasing the target injection amount Q2 by exactly the amount of decrease of the target injection amount Q1 so as to satisfy the demanded torque.

At step S12, the electronic control unit 200 corrects the target injection timing A1 of the first main fuel injection G1 so that the ignition timing is advanced. Specifically, it performs correction to advance the target injection timing A1 of the first main fuel injection G1 in accordance with the amount of delay of the estimated ignition timing from the target ignition timing.

Note that, in the present embodiment, in this way, the ignition timing is advanced by correcting the target injection timing A1 of the first main fuel injection G1 to the advanced side, but, for example, instead of such advancing control of the target injection timing A1 or together with advancing control, it is also possible to correct the target injection amount Q1 to the increased side to thereby advance the ignition timing. Note that, in this case, it is sufficient to jointly perform correction decreasing the target injection amount Q2 by exactly the amount of increase of the target injection amount Q1.

According to the present embodiment explained above, there is provided an electronic control unit 200 (control device) for controlling an internal combustion engine 100 provided with an engine body 1, a fuel injector 20 injecting fuel for burning inside a combustion chamber 11 of the engine body 1, and a knock sensor (vibration sensor) 210 detecting vibration acceleration of the engine body 1. This is provided with a combustion control part controlling an injection amount and injection timing of fuel injected from the fuel injector 20 to a target injection amount and target injection timing set based on an engine operating state to cause combustion of the fuel by self ignition so as to cause heat generation inside the combustion chamber 11 two times in stages so the pressure waveform showing the change along with time of the rate of rise of cylinder pressure becomes a two-peak shape and so that a peak interval $\Delta\theta$ of the interval from a first peak value of a first peak of the pressure waveform formed by the first heat generation to a second peak value of a second peak of the pressure waveform formed by the second heat generation becomes a reference peak interval $\Delta\theta t$ where vibration acceleration of the target attenuation frequency band (specific frequency band) in the vibration acceleration of the engine body 1 is suppressed.

Further, the combustion control part is configured to calculate a first vibration level of the engine body 1 at a first judgment frequency band of a second overtone of the target attenuation frequency band based on vibration acceleration detected by the knock sensor 210 and, when the first vibration level is less than a predetermined first reference vibration level set in advance according to the engine operating state, to correct one or both of the target injection amount and target injection timing so that the first vibration level becomes the first reference vibration level or more.

If the shape of the pattern of rate of rise of cylinder pressure becomes the targeted two-peak shape, the first vibration level increases at the first judgment frequency band where the two pressure waves interfere with each other and the vibration level increases. By comparing the first vibration level with the first reference vibration level like in the present embodiment, it can be judged if the shape of the pattern of rate of rise of cylinder pressure has become the targeted two-peak shape. Further, if the first vibration level is less than the first reference vibration level, that is, the shape of the pattern of rate of rise of cylinder pressure has not become the targeted two-peak shape, it is possible to control the target injection amount or target injection timing so that the first vibration level becomes the first reference vibration level or more to thereby correct the shape of the pattern of rate of rise of cylinder pressure toward the targeted two-peak shape.

Further, the first judgment frequency band is the frequency band where the two pressure waves interfere with each other and the vibration level increases, so it is possible to precisely calculate the vibration level at that frequency band. For this reason, it is possible to judge with good precision if the shape of the pattern of rate of rise of cylinder pressure has changed from the targeted two-peak shape.

Further, the combustion control part according to the present embodiment is configured to successively inject at least first main fuel and second main fuel and calculate an estimated ignition timing of fuel when the first vibration level is less than the first reference vibration level and, if the estimated ignition timing is delayed from the target ignition timing set according to the engine operating state, to correct one or both of the target injection amount and the target injection timing of at least the first main fuel so that the ignition timing of the first main fuel is advanced and on the other hand, if the estimated ignition timing is advanced from the target ignition timing set according to the engine operating state, to correct one or both of the target injection amount and the target injection timing of at least the first main fuel so that the ignition timing of the first main fuel is delayed.

Due to this, it is possible to judge if the ignition timing has deviated from the target ignition timing to the advanced side and thereby the shape of the pattern of the rate of rise of pressure has ended up changing from the targeted two-peak shape or if the ignition timing has deviated from the target ignition timing to the delayed side and thereby the shape of the pattern of the rate of rise of pressure has ended up changing from the targeted two-peak shape. For this reason, it is possible to suitably correct one or both of the target injection amount and the target injection timing of the first main fuel in accordance with the results of judgment so that the first vibration level becomes the first reference vibration level or more.

Second Embodiment

Next, a second embodiment of the present disclosure will be explained. The present embodiment differs from the first embodiment on the point of further judging if the peak interval $\Delta\theta$ has become narrower than the reference peak interval $\Delta\theta t$ or has become broader. Below, this point of difference will be focused on in the explanation.

Figure 7:
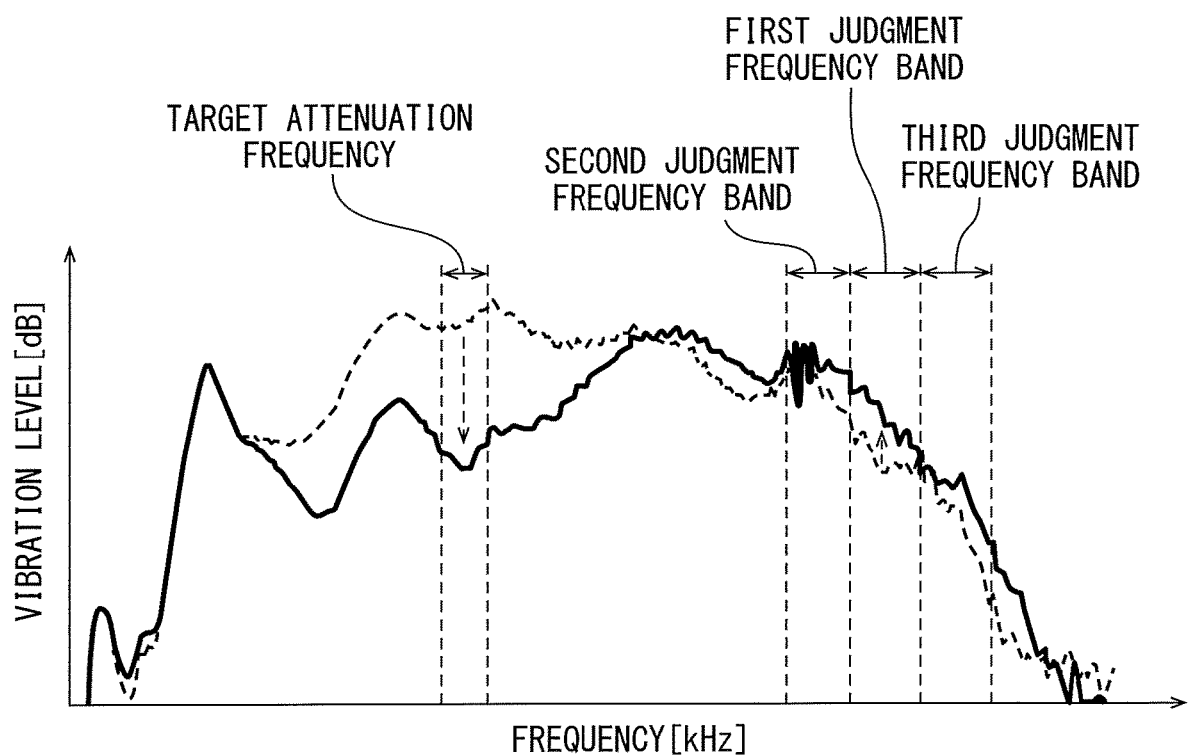
FIG. 7 is a view showing a vibration level of an engine body for each frequency calculated based on an output value of a knock sensor.

FIG. 7 is a view similar to FIG. 5.

In the first embodiment, the first vibration level at the first judgment frequency band was compared the first reference vibration level to judge if it was possible to reduce the vibration level at the target attenuation frequency band.

Here, as explained above, the attenuation frequency band tends to move the low frequency side the broader the peak interval $\Delta\theta$ and to move to the high frequency side the narrower the peak interval $\Delta\theta$.

For this reason, if the peak interval $\Delta\theta$ becomes broader than the reference peak interval $\Delta\theta t$, the attenuation frequency band moves to the low frequency side and, as a result, the frequency band of the second overtone of the same moves to the lower frequency side from the first judgment frequency band. Therefore, the vibration level of a second judgment frequency band at a lower frequency side from the first judgment frequency band shown in FIG. 7 increases.

On the other hand, if the peak interval $\Delta\theta$ becomes narrower than the reference peak interval $\Delta\theta t$, the attenuation frequency band moves to the high frequency side and, as a result, the frequency band of the second overtone of the same moves to the higher frequency side from the first judgment frequency band. Therefore, the vibration level of a third judgment frequency band at a higher frequency side from the first judgment frequency band shown in FIG. 7 increases.

Therefore, the present embodiment was designed so that if it is judged that the first vibration level of the first judgment frequency band is less than the first reference vibration level and the shape of the pattern of rate of rise of cylinder pressure has changed from the target shape over the allowable range, the vibration levels of the second judgment frequency band and the third frequency band are detected to judge if the peak interval $\Delta\theta$ has become broader than the reference peak interval $\Delta\theta t$ or has become narrower. Further, it was designed so as to correct the target value of the fuel injection amount of fuel injection timing set according to the engine operating state based on the results of judgment. Below, referring FIG. 8A and FIG. 8B, this combustion control according to the present embodiment will be explained.

Figure 8A:
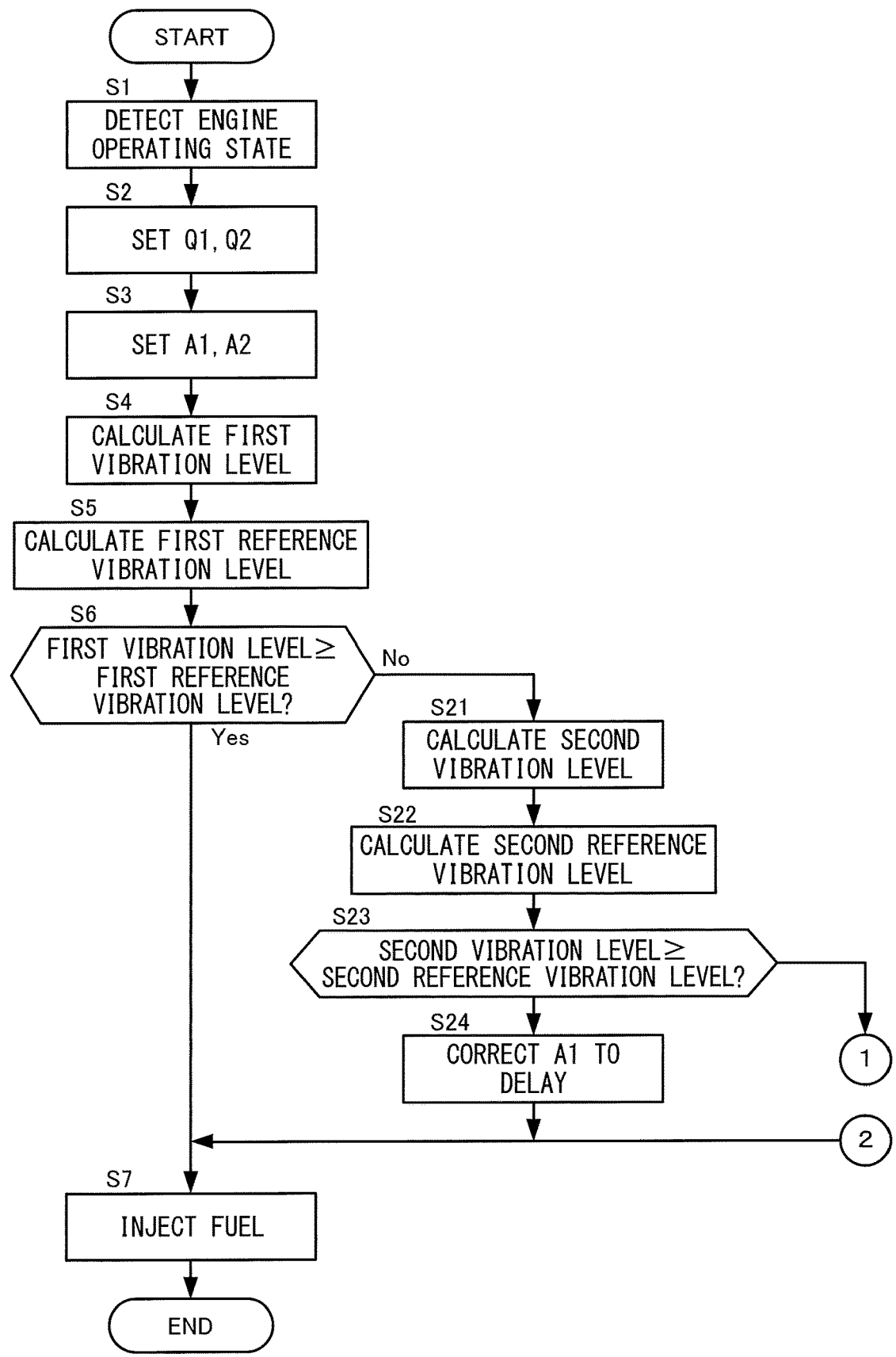
FIG. 8A is a flow chart explaining combustion control according to a second embodiment of the present disclosure.
Figure 8B:
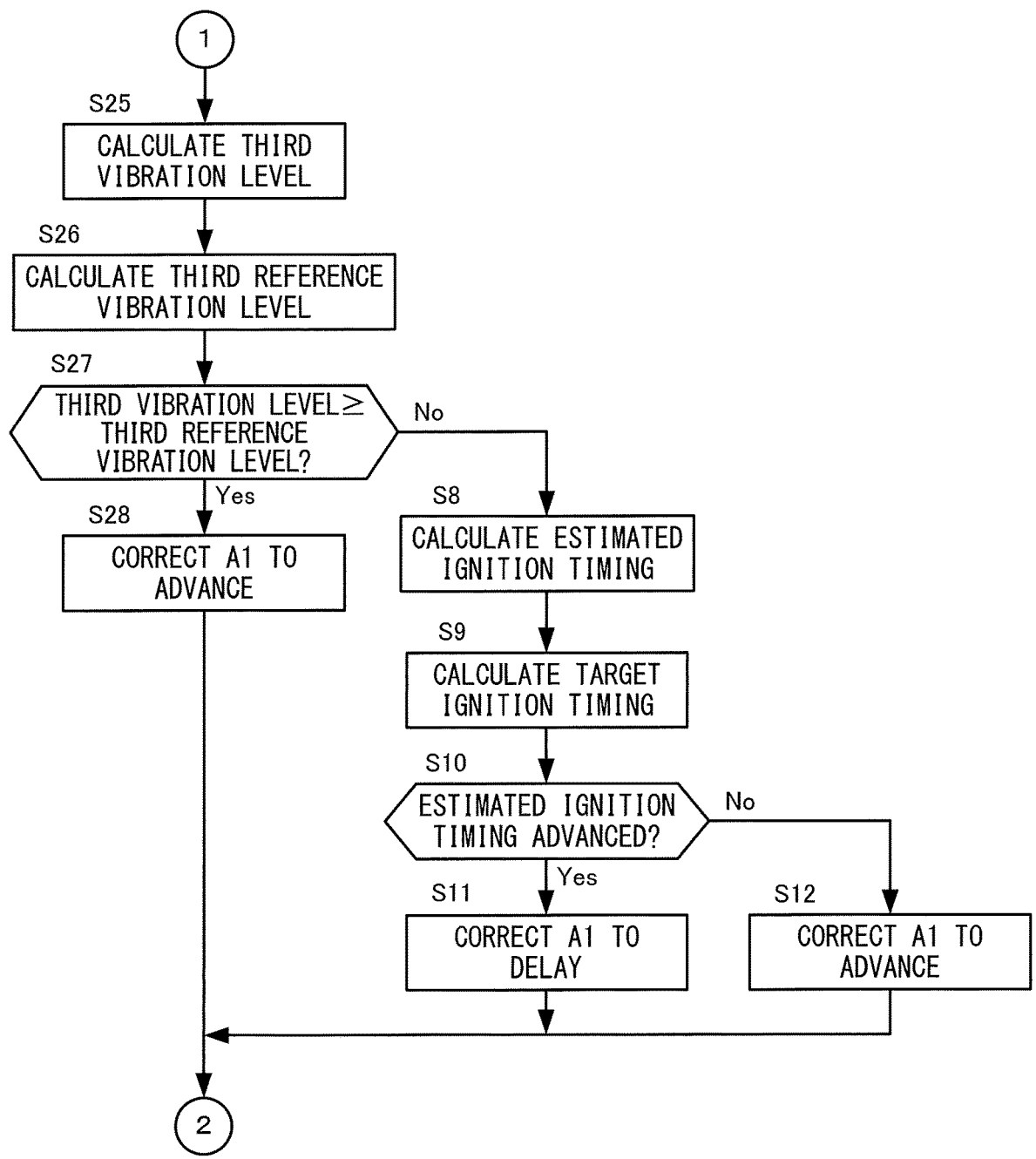
FIG. 8B is a flow chart explaining combustion control according to the second embodiment of the present disclosure.

FIG. 8A and FIG. 8B are flow charts for explaining the combustion control according to the present embodiment. The electronic control unit 200 repeatedly performs the present routine by a predetermined processing cycle during engine operation. Note that, in FIG. 8A and FIG. 8B, the processing from step S1 to step S12 are similar to the first embodiment, so explanations will be omitted here.

At step S21, the electronic control unit 200 applies various processing to the output value of the knock sensor 210 at the combustion noise judgment section acquired at the previous combustion cycle (for example, band pass filtering using the second judgment frequency band as the band width) to calculate the second vibration level of the second judgment frequency band. In the present embodiment, the second judgment frequency band is made the frequency band from 2.6 kHz to 3.0 kHz.

At step S22, the electronic control unit 200 refers to a map prepared in advance by experiments etc. and calculates the second reference vibration level based on the engine operating state.

At step S23, the electronic control unit 200 judges if the second vibration level is the second reference vibration level or more. If the second vibration level is the second reference vibration level or more, the electronic control unit 200 judges that the peak interval $\Delta\theta$ has become broader than the reference peak interval $\Delta\theta t$, then proceeds to the processing of step S24. On the other hand, if the second vibration level is less than the second reference vibration level, the electronic control unit 200 proceeds to the processing of step S25.

At step S24, the electronic control unit 200 controls one or both of the amount and injection timing of fuel injected from the fuel injector 20 so that the peak interval $\Delta\theta$ which ended up becoming broader than the reference peak interval $\Delta\theta t$ becomes narrower toward the reference peak interval $\Delta\theta t$. In the case of the present embodiment, basically, it is considered that the advance of the ignition timing of the first main fuel causes the first peak value P1 to end up moving to the advanced side and the peak interval $\Delta\theta$ to end up becoming broader, so the electronic control unit 200 performs correction to delay the target injection timing A1 of the first main fuel injection G1 by exactly a predetermined crank angle.

Note that, in the present embodiment, in this way, the target injection timing A1 of the first main fuel injection G1 is corrected to the delayed side to thereby delay the ignition timing of the first main fuel and make the peak interval $\Delta\theta$ become narrower toward the reference peak interval $\Delta\theta t$, but, for example, instead of such delaying control of the target injection timing A1 or together with delaying control, it is also possible to correct the target injection amount Q1 to the decreased side to thereby delay the ignition timing.

Note that, in this case, it is sufficient to jointly perform correction increasing the target injection amount Q2 by exactly the amount of decrease of the target injection amount Q1 so as to satisfy the demanded torque.

At step S25, the electronic control unit 200 processes the output value of the knock sensor 210 at the combustion noise judgment section acquired at the previous combustion cycle by various types of processing (for example, band pass filtering having the third judgment frequency band as the band width) to thereby calculate the vibration level of the third judgment frequency band. In the present embodiment, the third judgment frequency band is made the frequency band from 3.4 kHz to 3.8 kHz.

At step S26, the electronic control unit 200 refers to a map prepared in advance by experiments etc. and calculates a third reference vibration level based on the engine operating state.

At step S27, the electronic control unit 200 judges if the third vibration level is the third reference vibration level or more. If the third vibration level is the third reference vibration level or more, the electronic control unit 200 judges that the peak interval $\Delta\theta$ has become narrower than the reference peak interval $\Delta\theta t$, then proceeds to the processing of step S28. On the other hand, if the third vibration level is less than the third reference vibration level, the electronic control unit 200 judges that the shape of the pattern of rate of rise of cylinder pressure has not become a two-peak shape but has ended up becoming a single peak shape, then proceeds to the processing of step S8.

At step S28, the electronic control unit 200 controls one or both of the amount and injection timing of the fuel injected from the fuel injector 20 so that the peak interval $\Delta\theta$ which had become narrower than the reference peak interval $\Delta\theta t$ becomes broader toward the reference peak interval $\Delta\theta t$. In the case of the present embodiment, basically, it is considered that by delaying the ignition timing of the first main fuel, the first peak value P1 ends up moving to the delayed side and the peak interval $\Delta\theta$ ends up becoming narrower, so the electronic control unit 200 performs correction to make the target injection timing A1 of the first main fuel injection G1 advance by exactly a predetermined crank angle.

Note that, in the present embodiment, the target injection timing A1 of the first main fuel injection G1 is corrected to the advanced side to make the ignition timing advance, but, for example, instead of such control for advancing the target injection timing A1 or together with such advancing control, it is also possible to make the ignition timing advance by correcting the target injection amount Q1 to the increasing side. Note that, in this case, it is sufficient to jointly perform correction reducing the target injection amount Q2 by exactly the amount of increase of the target injection amount Q1.

The combustion control part of the electronic control unit 200 (control device) according to the present embodiment explained above is further configured to calculate a second vibration level of the engine body 1 at a second judgment frequency band near the first judgment frequency band and lower than the first judgment frequency band based on vibration acceleration detected by the knock sensor 210 (vibration sensor) and, when the first vibration level is less than the first reference vibration level and the second vibration level is a predetermined second reference vibration level set in advance according to the engine operating state or is more, correct one or both of the target injection amount and the target injection timing so that the peak interval $\Delta\theta t$ becomes narrower. More specifically, the combustion control part is configured to correct one or both of the target injection amount and the target injection timing of the first main fuel so as to delay the ignition timing of the first main fuel and make the peak interval $\Delta\theta t$ narrower.

Further, the combustion control part is, furthermore, configured to calculate the third vibration level of the engine body 1 at a third judgment frequency band near the first judgment frequency band and higher than the first judgment frequency band based on the vibration acceleration detected by the knock sensor 210 and, when the first vibration level is less than the first reference vibration level and the third vibration level is a predetermined third reference vibration level set in advance according the engine operating state or is more, to correct one or both of the target injection amount and target injection timing so that the peak interval $\Delta\theta t$ becomes broader. In more detail, the combustion control part is configured to correct one or both of the target injection amount and the target injection timing of the first main fuel so that the ignition timing of the first main fuel is advanced and the peak interval $\Delta\theta t$ becomes broader.

Due to this, the two-peak shape can be maintained, but even if the peak interval $\Delta\theta$ deviates from the reference peak interval $\Delta\theta t$ or otherwise the change in the shape of the pattern of rate of rise of cylinder pressure is small, it is possible to obtain an accurate grasp of the change and correct the shape of the pattern of rate of rise of cylinder pressure toward the targeted two-peak shape.

Above, embodiments of the present disclosure were explained, but the above embodiments only show part of the applications of the present disclosure and are not mean to limit the technical scope of the present disclosure to the specific configurations of the embodiments.

For example, in the above embodiments, the injection amounts and the injection timings of the fuel injections G1 and G2 were controlled to cause heat generation two times in stages so that the first main fuel and the second main fuel are respectively burned by homogeneous charge compression ignition combustion, but it is also possible to control the injection amounts and the injection timings of the fuel injections G1 and G2 to cause heat generation two times in stages so that the first main fuel and the second main fuel respectively burn by diffusion combustion.

The invention claimed is:

1. A control device for an internal combustion engine,
the internal combustion engine comprising;
an engine body;
a fuel injector injecting fuel for combustion inside a combustion chamber of the engine body; and
a vibration sensor detecting vibration acceleration of the engine body, wherein
the control device comprises a combustion control part configured to control an injection amount and injection timing of fuel injected from the fuel injector to a target injection amount and target injection timing set based on an engine operating state to cause the fuel to burn by self ignition so as to cause generation of heat in the combustion chamber two times in stages so a pressure waveform showing a change along with time of a rate of rise of cylinder pressure becomes a two-peak shape and so that a peak interval from a first peak value of a first peak of the pressure waveform formed by the first heat generation to a second peak value of a second peak of the pressure waveform formed by the second heat generation becomes a reference peak interval suppressing vibration acceleration of a specific frequency band in vibration acceleration of the engine body, and
the combustion control part is configured to:

calculate a first vibration level of the engine body in a first judgment frequency band of a second overtone of the specific frequency based on vibration acceleration detected by the vibration sensor; and, when the first vibration level is less than a predetermined first reference vibration level set in advance according to the engine operating state, correct one or both of the target injection amount and the target injection timing so that the first vibration level becomes the first reference vibration level or more.

2. The control device for the internal combustion engine according to claim 1, wherein
the combustion control part is further configured to:
successively inject at least first main fuel and second main fuel; and,
when the first vibration level is less than the first reference vibration level, calculate an estimated ignition timing of fuel and, if the estimated ignition timing is delayed from the target ignition timing set according to the engine operating state, correct one or both of the target injection amount and the target injection timing of at least the first main fuel so that the ignition timing of the first main fuel is advanced.

3. The control device for the internal combustion engine according to claim 1, wherein
the combustion control part is further configured to:
successively inject at least first main fuel and second main fuel; and,
when the first vibration level is less than the first reference vibration level, calculate an estimated ignition timing of fuel and, if the estimated ignition timing is advanced from the target ignition timing set according to the engine operating state, correct one or both of the target injection amount and the target injection timing of at least the first main fuel so that the ignition timing of the first main fuel is delayed.

4. The control device for the internal combustion engine according to claim 1, wherein
the combustion control part is further configured to:
calculate a second vibration level of the engine body at a second judgment frequency band near the first judgment frequency band and lower than the first judgment frequency band based on vibration acceleration detected by the vibration sensor; and,
when the first vibration level is less than the first reference vibration level and the second vibration level is a predetermined second reference vibration level set in advance according to the engine operating state or is more, correct one or both of the target injection amount and the target injection timing so that the peak interval becomes narrower.

5. The control device for the internal combustion engine according to claim 4, wherein
the combustion control part is further configured to:
successively inject at least first main fuel and second main fuel; and
correct one or both of the target injection amount and the target injection timing of the first main fuel so as to delay the ignition timing of the first main fuel and make the peak interval narrower.

6. The control device for the internal combustion engine according to claim 1, wherein
the combustion control part is configured to:
calculate a third vibration level of the engine body at a third judgment frequency band near the first judgment frequency band and higher than the first judgment frequency band based on vibration acceleration detected by the vibration sensor; and,
when the first vibration level is less than the first reference vibration level and the third vibration level is a predetermined third reference vibration level set in advance according to the engine operating state or is more, correct one or both of the target injection amount and the target injection timing so that the peak interval becomes broader.

7. The control device for the internal combustion engine according to claim 6, wherein
the combustion control part is further configured to:
successively inject at least first main fuel and second main fuel; and
correct one or both of the target injection amount and the target injection timing of the first main fuel so as to advance the ignition timing of the first main fuel and make the peak interval broader.

8. An internal combustion engine comprising:
an engine body;
a fuel injector injecting fuel for combustion inside a combustion chamber of the engine body;
a vibration sensor detecting vibration acceleration of the engine body;
a control device configured to control an injection amount and injection timing of fuel injected from the fuel injector to a target injection amount and target injection timing set based on an engine operating state to cause the fuel to burn by self ignition so as to cause generation of heat in the combustion chamber two times in stages so a pressure waveform showing a change along with time of a rate of rise of cylinder pressure becomes a two-peak shape and so that a peak interval from a first peak value of a first peak of the pressure waveform formed by the first heat generation to a second peak value of a second peak of the pressure waveform formed by the second heat generation becomes a reference peak interval suppressing vibration acceleration of a specific frequency band in vibration acceleration of the engine body, wherein
the control device is further configured to:
calculate a first vibration level of the engine body in a first judgment frequency band of a second overtone of the specific frequency based on vibration acceleration detected by the vibration sensor; and,
when the first vibration level is less than a predetermined first reference vibration level set in advance according to the engine operating state, correct one or both of the target injection amount and the target injection timing so that the first vibration level becomes the first reference vibration level or more.

* * * * *